United States Patent

[11] 3,627,344

| [72] | Inventor | Anthony Rizzuto<br>37-07-92nd St., Jackson Heights, N.Y. 11372 |
|---|---|---|
| [21] | Appl. No. | 5,304 |
| [22] | Filed | Jan. 23, 1970 |
| [45] | Patented | Dec. 14, 1971 |

[54] CONVERSION KIT FOR A SHOPPING CART
9 Claims, 5 Drawing Figs.

[52] U.S. Cl. .................................................. 280/47.2,
280/35, 280/47.26, 280/47.33, 280/47.34, 280/150 A
[51] Int. Cl. ...................................................... B62b 3/02
[50] Field of Search .......................................... 280/30, 35,
47.13, 47.17, 47.2, 47.26, 47.33, 47.34, 79.1,
79.2, 79.2, 79.3, 150 A; 16/29, 30, 40

[56] References Cited
UNITED STATES PATENTS

| 139,606 | 6/1873 | Plank | 280/35 |
| 150,264 | 4/1874 | Strong | 280/47.13 |
| 168,182 | 9/1875 | Pratt | 280/35 |
| 345,090 | 7/1886 | Walter | 280/47.2 X |
| 1,460,928 | 7/1923 | Tilden | 280/79.3 UX |
| 1,853,318 | 4/1932 | Peters | 280/35 |
| 2,654,421 | 10/1953 | Neff | 280/35 |
| 2,918,295 | 12/1959 | Milner | 280/47.2 X |
| 2,920,900 | 1/1960 | Best | 280/36 C |

FOREIGN PATENTS

| 1,184,624 | 2/1959 | France | 280/47.2 |

*Primary Examiner*—Leo Friaglia
*Assistant Examiner*—Leslie J. Paperner
*Attorney*—Shoemaker & Mattare ABSTRACT: A conversion kit is provided for a shopping cart including a basket portion having an axle with a pair of wheels rotatably mounted thereon, the cart also including a pair of spaced legs. The conversion kit includes axle means comprising a pair of portions relatively movable with respect to one another, and locking means is provided for locking the portions of this axle means in adjusted portion. Clamp members are secured to opposite ends of the axle means of the conversion kit and receive the lower ends of the legs of the shopping cart to convert a two-wheeled shopping cart into a four-wheeled shopping cart.

PATENTED DEC 14 1971 3,627,344
FIG.1.
FIG.4.
FIG.5.
FIG.3.
FIG.2.
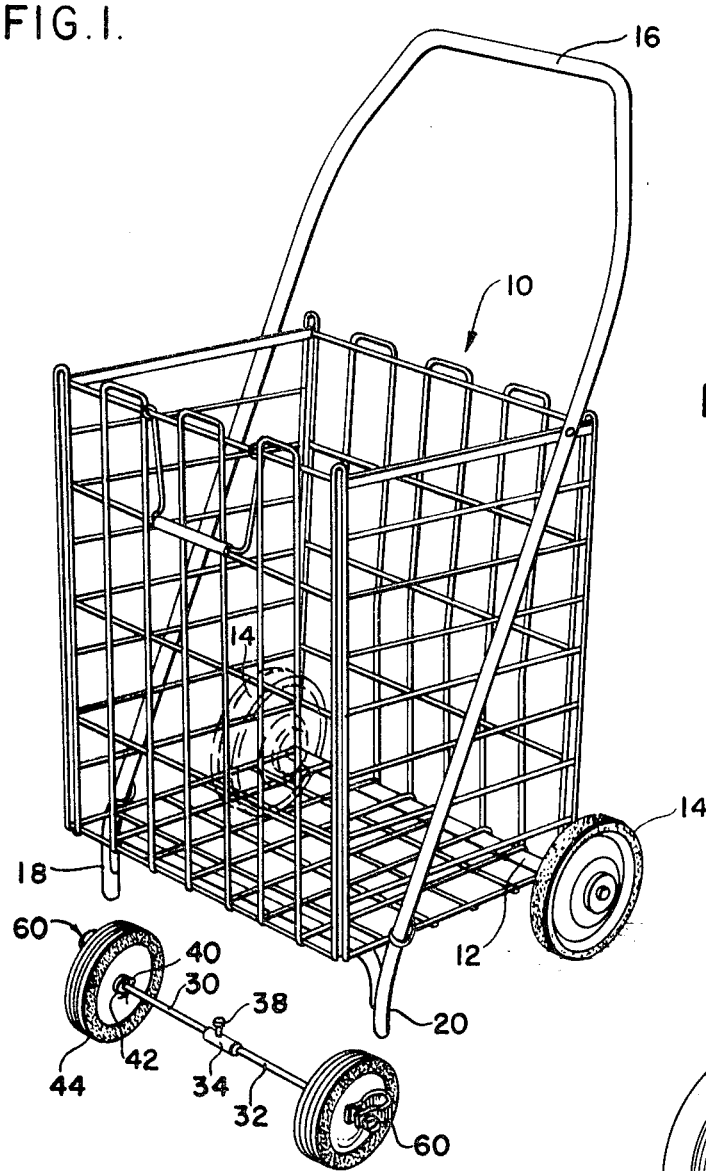
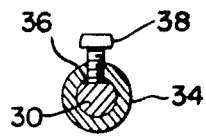
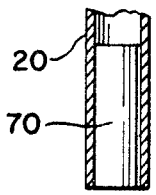
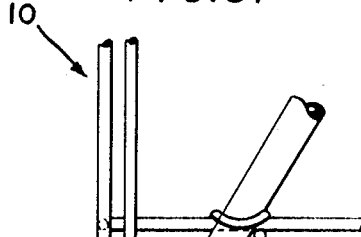
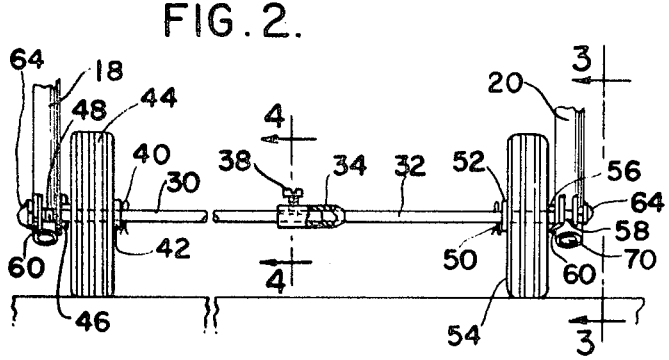
INVENTOR
ANTHONY RIZZUTO
BY *Shoemaker and Mattare*
ATTORNEYS

CONVERSION KIT FOR A SHOPPING CART

BACKGROUND OF THE INVENTION

The present invention relates to a conversion kit for converting a two-wheeled shopping cart into a four-wheeled shopping cart. A typical example of a two-wheeled shopping cart is shown in U.S. Pat. No. 2,920,900, wherein the shopping cart includes a basket portion and has an axle with a pair of wheels rotatably mounted thereon. The cart also includes a pair of spaced depending legs.

The present invention is directed to one way in which the conversion kit is adapted to convert a two-wheeled cart as shown in the aforementioned patent into a four-wheeled cart or to convert any other type of two-wheeled shopping cart into four-wheeled shopping carts. This objective is accomplished by providing a conversion kit which is adapted to be secured to the depending front legs of the two-wheeled cart. The conversion kit is of such a construction that it is easily secured in operative position to the cart with a minimum amount of time and effort.

Additionally, since two-wheeled shopping carts are manufactured in various sizes, it is desirable to provide a conversion kit including means for selectively adjusting the width thereof whereby the conversion kit does accommodate shopping carts of different sizes.

SUMMARY OF THE INVENTION

The conversion kit of the present invention includes an axle means having a pair of separate portions which are slidable with respect to one another whereby the length of the axle means can be readily adjusted. Locking means is also provided for securing the two portions of the axle means in adjusted position.

Clamp members are mounted at opposite ends of the axle means, these clamp members receiving the depending legs of a shopping cart. Such legs on a shopping cart are generally provided with cushioning pads of rubber or the like which can be easily removed whereupon the depending legs can slide into the clamp members of the conversion kit.

It is apparent that the conversion kit of the present invention can be readily mounted in position simply by slipping the legs of the shopping cart into the clamp members mounted at the opposite ends of the axle means of the kit. Furthermore, the width of the conversion kit can be quickly and easily adjusted so as to accommodate shopping carts of different sizes.

BRIEF DESCRIPTION OF THE DRAWING

FIG. 1 is a top perspective exploded view illustrating the conversion kit of the present invention as employed with a two-wheeled shopping cart;

FIG. 2 is a front view of the conversion kit of the present invention illustrating it in assembled position wherein the depending legs of the shopping cart are secured by the clamp portions of the conversion kit;

FIG. 3 is an enlarged view partly broken away and taken substantially along lines 3—3 of FIG. 2 looking in the direction of the arrows;

FIG. 4 is an enlarged sectional view taken substantially along lines 4—4 of FIG. 2 looking in the direction of the arrows; and FIG. 5 is an enlarged sectional view through the lower end of one of the depending legs of the shopping cart.

DESCRIPTION OF THE PREFERRED EMBODIMENTS

Referring now to the drawing wherein like reference characters designate corresponding parts throughout the several views, FIG. 1 illustrates a two-wheeled shopping cart of the type shown in U.S. Pat. No. 2,920,900 the disclosure of which is incorporated by reference into the present application. The shopping cart includes a collapsible basket 10 portions of which are connected with an axle 12 having a pair of wheels 14 rotatably mounted thereon at opposite ends thereof. The shopping cart includes a generally U-shaped handle 16 the opposite sides of which define depending legs 18 and 20 at the lower part of the cart. These depending legs normally have cushioning pads of rubber or the like secured thereto which have been removed as shown in FIG. 1 so as to facilitate securing of the conversion kit to the legs of the shopping cart.

As seen in FIG. 2, the conversion kit of the present invention includes an axle means comprising two separate axle portions 30 and 32. Axle portion 32 includes an enlarged tubular part 34 which telescopically receives an end of axle portion 30. Referring to FIG. 4, the end of axle portion 30 is provided with a flat 36 which is engaged by the inner end of a lock screw 38 which is threaded within a suitable radially extending threaded hole provided in tubular part 34. It is apparent that the relative axial positions of axle portions 30 and 32 can be adjusted and locked in adjusted position by means of lock screw 38.

Referring again to FIG. 2, a cotter pin 40 is secured in place through a suitable diametrically extending hole provided in axle portion 30, the cotter pin serving to hold a washer 42 in operative position about axle portion 30. Washer 42 is in engagement with the inner surface of a wheel 44. A nut 46 is threaded on the outer threaded end 48 of axle portion 30, nut 46 retaining wheel 44 in operative position.

A second cotter pin 50 is secured in place through a diametrically extending hole provided in axle portion 32, this cotter pin holding a washer 52 in position about axle portion 32. Washer 52 engages the inner surface of a wheel 54. A nut 56 is threaded on the outer threaded end 58 of axle portion 32 and retains wheel 54 in operative position.

The means for securing the axle means of the conversion kit to the legs of the shopping cart comprises a pair of similar clamp members 69 which snugly receive the depending legs of the shopping cart.

Each of the clamp members 60 comprises a generally U-shaped member 62, the opposite legs of each of which are provided with aligned holes which receive the threaded end of the associated axle portion. An acorn nut 64 is threaded on the outer end of each of the axle portions and engages the adjacent clamp member to tightly secure the clamp member in operative position about the associated leg of the shopping cart and further holding the clamp member in place on the axle portion.

In order to prevent the lower ends of the legs of the cart from collapsing when the clamp members are tightened thereabout, a plug member 70 formed of suitable material such as wood is inserted in the lower open end of each of the legs and has a tight fit therewith as clearly shown in FIGS. 3 and 5.

As this invention may be embodied in several forms without departing from the spirit or essential characteristics thereof, the present embodiment is therefore illustrative and not restrictive.

I claim:

1. A conversion kit for a shopping cart including a basket portion and having an axle with a pair of wheels rotatably mounted thereon, said cart also including a pair of spaced legs, said conversion kit being adapted to convert said cart into a four-wheeled cart, the conversion kit comprising an axle and wheel assembly including an elongated axle means, a pair of wheels rotatably mounted on the opposite ends of said axle means, adjusting means for adjusting the length of said axle means for accommodating shopping carts of different widths, and mounting means on the ends of said axle means adjacent said wheels for removably securing the axle means of the conversion kit to the legs of the shopping cart, said mounting means including means for receiving the lower ends of the shopping cart legs therethrough, and means for tightening said mounting means on said shopping cart legs.

2. Apparatus as defined in claim 1, wherein the axle means of the conversion kit includes two separate portions relatively movable with respect to one another for adjusting the length of such axle means.

3. Apparatus as defined in claim 2 including locking means for locking said portions of the axle means in adjusted position with respect to one another.

4. Apparatus as defined in claim 1, wherein the mounting means for securing the conversion kit axle means to the legs of the shopping cart comprises a pair of clamp members each of which receives the lower end of one of the legs of the shopping cart.

5. Apparatus as defined in claim 4, wherein said clamp members are generally U-shaped in configuration.

6. Apparatus as defined in claim 5, including means for securing said clamp members in operative position about the legs of the shopping cart.

7. Apparatus as defined in claim 4 wherein each of said legs is open and hollow at the lower end thereof and including a plug member disposed within the lower end of each of said legs to prevent collapse of such lower ends of the legs by said clamp members.

8. Apparatus as defined in claim 1, wherein the means for securing the axle means of the conversion kit to the legs of the shopping cart comprises similar means at each end of the axle means including a threaded axle portion, a generally U-shaped clamp member means each having opposite legs each of which has a hole formed therethrough, the axle portion extending through said holes, each of said clamp members receiving the lower end of the legs of the shopping cart, the bight portion of said clamp members embracing and holding said shopping cart legs in place with respect to the axle portion, and means threaded on the threaded axle portion and engageable with one of the legs of the said clamp members for securing the clamp members in operative position.

9. Apparatus as defined in claim 8, wherein said axle means of the conversion kit includes a pair of separate portions movable with respect to one another, one of said portions telescopically receiving the other of said portions and locking means for locking said telescopic portions in adjusted position with respect to one another.

* * * * *